(12) United States Patent
Saha et al.

(10) Patent No.: US 7,928,686 B2
(45) Date of Patent: Apr. 19, 2011

(54) ELECTRIC MOTOR CONTROL DEVICE, ELECTRIC VEHICLE, AND HYBRID ELECTRIC VEHICLE

(75) Inventors: Subrata Saha, Anjo (JP); Isao Fujiwara, Nagoya (JP); Keisuke Nishimura, Anjo (JP); Kazuma Hasegawa, Kariya (JP); Yoshinori Oono, Nukata (JP); Seiichi Kinugasa, Kariya (JP)

(73) Assignee: Aisin AW Co., Ltd., Anjo (JP)

( * ) Notice: Subject to any disclaimer, the term of this patent is extended or adjusted under 35 U.S.C. 154(b) by 393 days.

(21) Appl. No.: 12/289,691

(22) Filed: Oct. 31, 2008

(65) Prior Publication Data

US 2009/0115362 A1 May 7, 2009

(30) Foreign Application Priority Data

Nov. 1, 2007 (JP) ................................ 2007-285254

(51) Int. Cl.
*H02P 5/00* (2006.01)
*F02N 11/04* (2006.01)

(52) U.S. Cl. .................... 318/807; 318/811; 180/65.285

(58) Field of Classification Search .................. 318/727, 318/798, 802, 807, 810, 811, 430, 432, 434; 180/65.1, 65.275, 65.285; 701/22
See application file for complete search history.

(56) References Cited

U.S. PATENT DOCUMENTS

| 4,691,269 | A | * | 9/1987 | Yamane et al. ................. 363/41 |
| 5,650,708 | A | | 7/1997 | Sawada et al. |
| 6,727,599 | B2 | * | 4/2004 | Schlangen .................. 290/40 B |
| 6,924,618 | B2 | * | 8/2005 | Matsushiro et al. .......... 318/811 |
| 7,443,116 | B2 | * | 10/2008 | Kutsuna et al. ............... 318/139 |
| 7,594,491 | B2 | * | 9/2009 | Yanagida et al. ......... 123/179.28 |
| 2004/0207360 | A1 | | 10/2004 | Matsuhiro et al. |
| 2007/0114965 | A1 | * | 5/2007 | Kutsuna et al. ............... 318/807 |
| 2007/0175429 | A1 | * | 8/2007 | Yanagida et al. ......... 123/179.14 |
| 2007/0296359 | A1 | * | 12/2007 | Seo et al. ...................... 318/139 |
| 2009/0021198 | A1 | * | 1/2009 | Okamura et al. .......... 318/400.3 |
| 2009/0184681 | A1 | * | 7/2009 | Kuno ............................ 320/128 |

FOREIGN PATENT DOCUMENTS

| JP | A-7-303302 | 11/1995 |
| JP | A-10-225132 | 8/1998 |
| JP | A-2004-231170 | 8/2004 |
| JP | A-2004-289985 | 10/2004 |
| JP | B2-3837986 | 10/2006 |

* cited by examiner

*Primary Examiner* — Walter Benson
*Assistant Examiner* — Eduardo Colon
(74) *Attorney, Agent, or Firm* — Oliff & Berridge, PLC

(57) ABSTRACT

An electric motor control device includes a direct current power source; an inverter interposed between an electric motor and the direct current power source, the inverter device controlling an exchange of electric power therebetween; an inverter control unit that generates PWM pulses having a duty ratio corresponding to voltage command signals and sends the PWM pulses to the inverter in order to switch the inverter; a frequency changing unit that changes a carrier frequency of the PWM pulses generated by the inverter control unit in a manner corresponding to a frequency control signal; and a motor control unit.

10 Claims, 10 Drawing Sheets

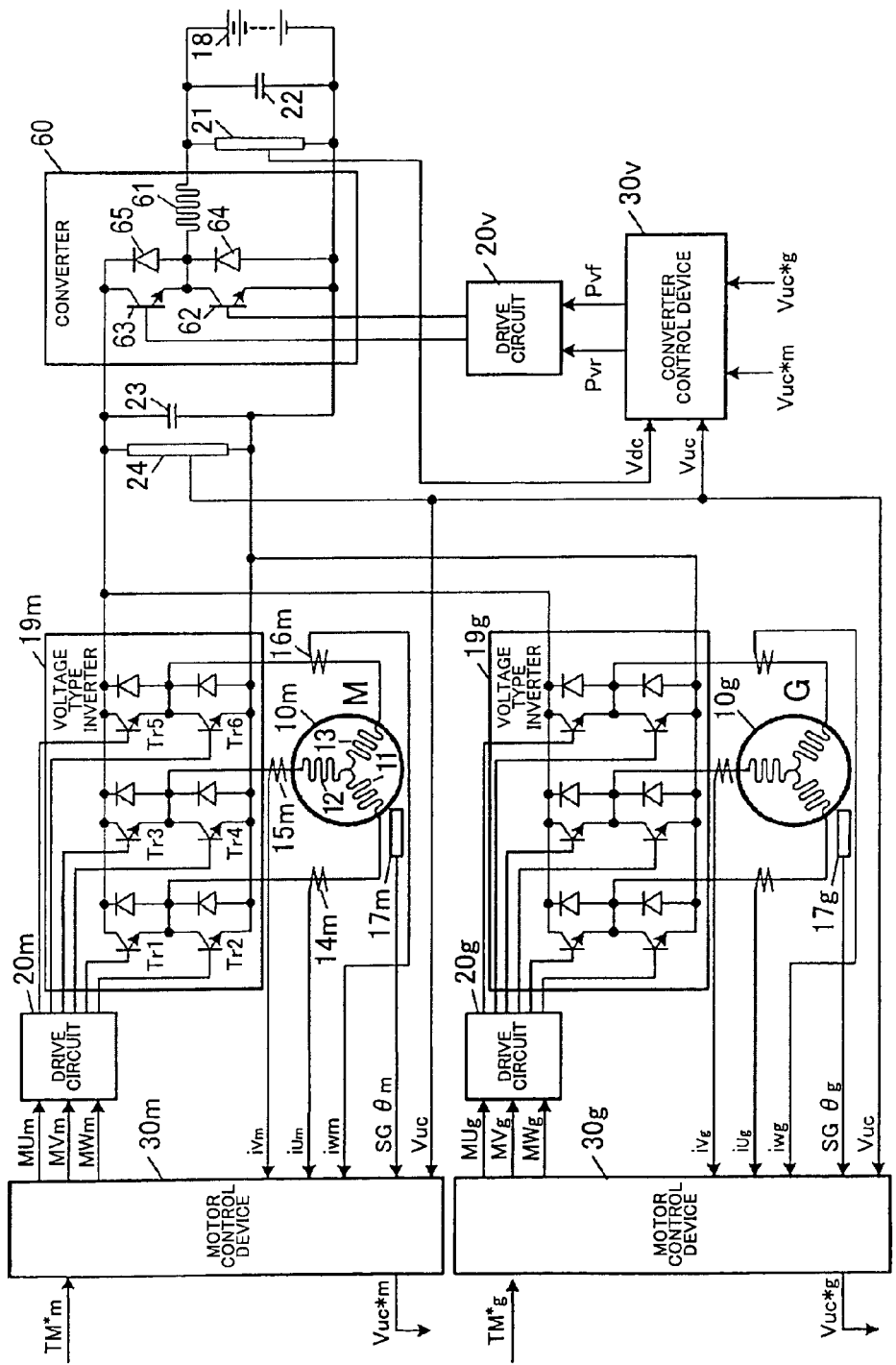
F I G. 1

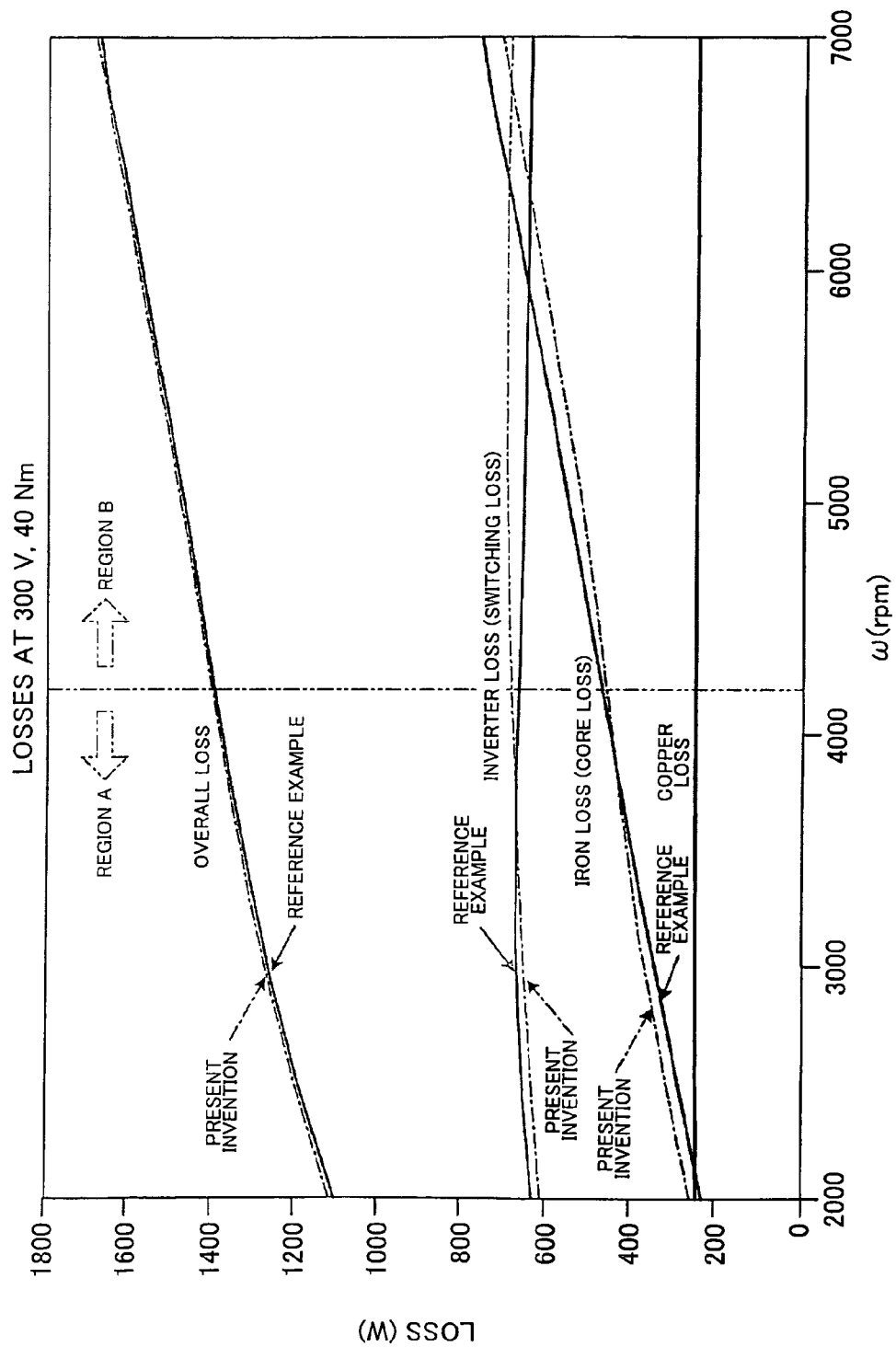

ELECTRIC MOTOR CONTROL DEVICE, ELECTRIC VEHICLE, AND HYBRID ELECTRIC VEHICLE

INCORPORATION BY REFERENCE

The disclosure of Japanese Patent Application No. 2007-285254 filed on Nov. 1, 2007 including the specification, drawings and abstract is incorporated herein by reference in its entirety.

BACKGROUND

The present invention relates to an electric motor control device and a hybrid drive unit.

Japanese Patent Application Publication No. JP-A-7-303302 describes an electric motor drive employing a two-phase modulation system in which one phase voltage of three phase voltages applied to an electric motor is fixed at a high level or a level, and the remaining two phases are PWM-controlled. The two-phase modulation generates distortion in a waveform of the voltage applied to the electric motor, causing noise and degradation in efficiency. In order to improve these problems, Japanese Patent Application Publication No. JP-A-7-303302 presents a control system for reducing the distortion in the waveform. In addition, because the modulation becomes equivalent to a three-phase modulation if a shift amount of a triangular wave becomes 0 in a stage to generate a PWM waveform in the two-phase modulation, Japanese Patent Application Publication No. JP-A-7-303302 presents a switching control between two-phase and three-phase in which the modulation system is switched to the three-phase modulation system by specifying the shift amount to 0.

In a range in which a rotational speed of the motor is comparatively low, uncomfortable high-frequency noise is large if a carrier frequency of PWM pulses is low, whereas a switching loss in an inverter increases if the carrier frequency is increased. Therefore, in order to improve these problems, Japanese Patent No. JP-B2-3837986 presents a motor control device that increases the carrier frequency in the range in which the rotational speed of the motor is comparatively low and reduces the carrier frequency in a range in which the rotational speed of the motor is high. In addition, in the range in which the rotational speed of the motor is high, the motor is energized by rectangular waves, and in the range in which the rotational speed of the motor is low, the motor is energized by sine waves, by partial sine waves, or in an overlapping manner.

Japanese Patent Application Publication No. JP-A-2004-289985 describes inverter control that uses the three-phase modulation and a carrier frequency of a high value (7 kHz) in the case of a high target torque at a high-speed rotation, and uses the two-phase modulation and the carrier frequency of a low value (5 kHz) in other cases. Japanese Patent Application Publication No. JP-A-2004-289985 also describes a selection between the two-phase modulation and the three-phase modulation, as well as switching of the carrier frequency, and shows voltage waveforms applied to the electric motor in the two-phase modulation with a carrier frequency of 5 kHz, in the three-phase modulation with a carrier frequency of 5 kHz, in the three-phase modulation with a carrier frequency of 7 kHz, and in the two-phase modulation with a carrier frequency of 7 kHz, respectively, in FIGS. 4 to 7. Japanese Patent Application Publication No. JP-A-2004-289985 also shows a hysteresis in a frequency switching between the two-phase modulation with 5 kHz and the three-phase modulation with 7 kHz, in FIG. 8.

It is a problem that side band noise is included in an audio frequency band while a vehicle is running at a speed in the vicinity of 20 mph (miles per hour) to 50 mph (with a rotation of 2000 rpm to 8000 rpm, and a torque of −100 Nm to +100 Nm in a motor speed range). As a method to reduce the side band noise of the vehicle by inverter control, a method of increasing the carrier frequency is known. For example, according to Japanese Patent No. JP-B2-3837986, the noise is reduced by increasing the carrier frequency in the low-speed range. In general, the modulation system (voltage control mode) is not changed when the carrier frequency is switched to suppress the side band noise. Although, according to Japanese Patent Application Publication No. JP-A-2004-289985, the switching is performed between the two-phase modulation with 5 kHz and the three-phase modulation with 7 kHz (FIGS. 8 and 9, paragraph 0059), it is described that the switching is used to suppress a protective operation (shutdown) caused by a large drop in an inverter input voltage.

SUMMARY

If the carrier frequency is increased to reduce the side band noise without changing a voltage modulation mode, the switching loss of the inverter can increase, causing an overheating of the inverter. Moreover, a power loss of the electric motor drive increases. In the inverter control in which the switching is performed between the two-phase modulation with 5 kHz and the three-phase modulation with 7 kHz as described in Japanese Patent Application Publication No. JP-A-2004-289985, the two-phase modulation includes only a small number of switching operations as a total number of three-phase switching operations and also the carrier frequency of 5 kHz requires only a small number of switching operations, thus producing a small switching loss, whereas the side band noise is large. Therefore, driving in the two-phase modulation with 5 kHz is expected to produce a small power loss but a large noise. The three-phase modulation includes a large number of switching operations as a total number of three-phase switching operations and also the carrier frequency of 7 kHz produces a large switching loss although the noise is small. Therefore, driving in the three-phase modulation with 7 kHz is expected to produce a small noise but a large power loss. Consequently, it is desired to satisfy both the noise reduction and the power loss reduction.

The present invention thus reduces side band noise and also suppresses a power loss, as well as achieve various other advantages.

In order to achieve the present invention described above, in providing an inverter interposed between an electric motor and a direct current power source, and controlling exchange of electric power between the electric motor and the direct current power source by switching the inverter by PWM pulses, a carrier frequency of the PWM pulses is determined to be a high frequency at which the side band noise is small when a target torque and a rotational speed of the electric motor are in a predetermined region set for suppressing the side band noise, whereas the carrier frequency is determined to be a low frequency that is lower than the high frequency and that reduces the switching loss of the inverter when the target torque and the rotational speed are outside of the predetermined region, and coil voltages, that is, phase voltages, of the electric motor are PWM-controlled so that an output torque of the electric motor coincides with the target torque.

An electric motor control device according to an exemplary aspect of the present invention includes a direct current power source; an inverter interposed between an electric motor and the direct current power source, the inverter device controlling an exchange of electric power therebetween; an inverter control unit that generates PWM pulses having a duty ratio corresponding to voltage command signals and sends the PWM pulses to the inverter in order to switch the inverter; a frequency changing unit that changes a carrier frequency of the PWM pulses generated by the inverter control unit in a manner corresponding to a frequency control signal; and a motor control unit that provides, when a target torque and a rotational speed of the electric motor are in a predetermined region, the frequency changing unit with the frequency control signal that sets the carrier frequency to a high frequency, and during this switching, if a voltage control mode that controls three phase voltages of the electric motor is a three-phase modulation mode in which each of the three phase voltages is controlled through PWM, switches the mode to a two-phase modulation mode in which two phases are controlled through PWM while PWM switching is not applied to the other one phase, that provides, when the target torque and the rotational speed are outside of the predetermined region, the frequency changing unit with the frequency control signal for setting the carrier frequency to a low frequency that is lower than the high frequency, and that provides the inverter control unit with the voltage command signals that makes an output torque of the electric motor coincide with the target torque.

An hybrid drive unit according to an exemplary aspect of the present invention includes a direct current power source; a first electric motor that drives wheels; a second electric motor rotationally driven by a fuel engine; a first inverter interposed between the first electric motor and the direct current power source, the first inverter controlling an exchange of electric power therebetween; a second inverter interposed between the second electric motor and the direct current power source, the second inverter controlling an exchange of electric power therebetween; a first inverter control unit that generates first PWM pulses having a duty ratio corresponding to first voltage command signals and sends the first PWM pulses to the first inverter in order to switch the first inverter; a second inverter control unit that generates second PWM pulses having a duty ratio corresponding to second voltage command signals and that sends the second PWM pulses to the second inverter in order to switch the second inverter; a first frequency changing unit that changes a first carrier frequency of the first PWM pulses generated by the first inverter control unit in a manner corresponding to a first frequency control signal; a second frequency changing unit that changes a second carrier frequency of the second PWM pulses generated by the second inverter control unit in a manner corresponding to a second frequency control signal; a first motor control unit that provides, when a target torque and a rotational speed of the first electric motor are in a first predetermined region, the first frequency changing unit with the first frequency control signal that sets the first carrier frequency to a high frequency, and during this switching, if a voltage control mode for controlling three phase voltages of the first electric motor is a three-phase modulation mode in which each of the three phase voltages is controlled through PWM, switches the mode to a two-phase modulation mode in which two phases are controlled through PWM while PWM switching is not applied to the other one phase, that provides, when the target torque and the rotational speed are outside of the first predetermined region in a case that the first carrier frequency is the high frequency, the first frequency changing unit with the first frequency control signal that sets the first carrier frequency to a low frequency that is lower than the high frequency, and switches the modulation mode to the three-phase modulation mode if a condition for switching to the three-phase modulation mode is satisfied, and that provides the first inverter control unit with the first voltage command signals that makes an output torque of the first electric motor coincide with the target torque; and a second motor control unit that provides, when a target torque and a rotational speed of the second electric motor are in a second predetermined region, the second frequency changing unit with the second frequency control signal that sets the second carrier frequency to a high frequency, and during this switching, if a voltage control mode for controlling three phase voltages of the second electric motor is a three-phase modulation mode in which each of the three phase voltages is controlled through PWM, switches the mode to a two-phase modulation mode in which two phases are controlled through PWM while PWM switching is not applied to the other one phase, that provides, when the target torque and the rotational speed are outside of the second predetermined region in the case that the second carrier frequency is the high frequency, the second frequency changing unit with the second frequency control signal that sets the second carrier frequency to a low frequency that is lower than the high frequency, and then switches the modulation mode to the three-phase modulation mode if a condition for switching to the three-phase modulation mode is satisfied, and that provides the second inverter control unit with the second voltage command signals that makes an output torque of the second electric motor coincide with the target torque.

BRIEF DESCRIPTION OF THE DRAWINGS

Various exemplary aspects of the invention will be described with reference to the drawings, wherein:

FIG. 1 is a block diagram showing an outline of a structure according to a first embodiment of the present invention;

FIG. 10 is a graph showing combined losses from power losses of the electric motor and an inverter shown in FIG. 1.

DETAILED DESCRIPTION OF THE PREFERRED EMBODIMENTS

Figure 2:
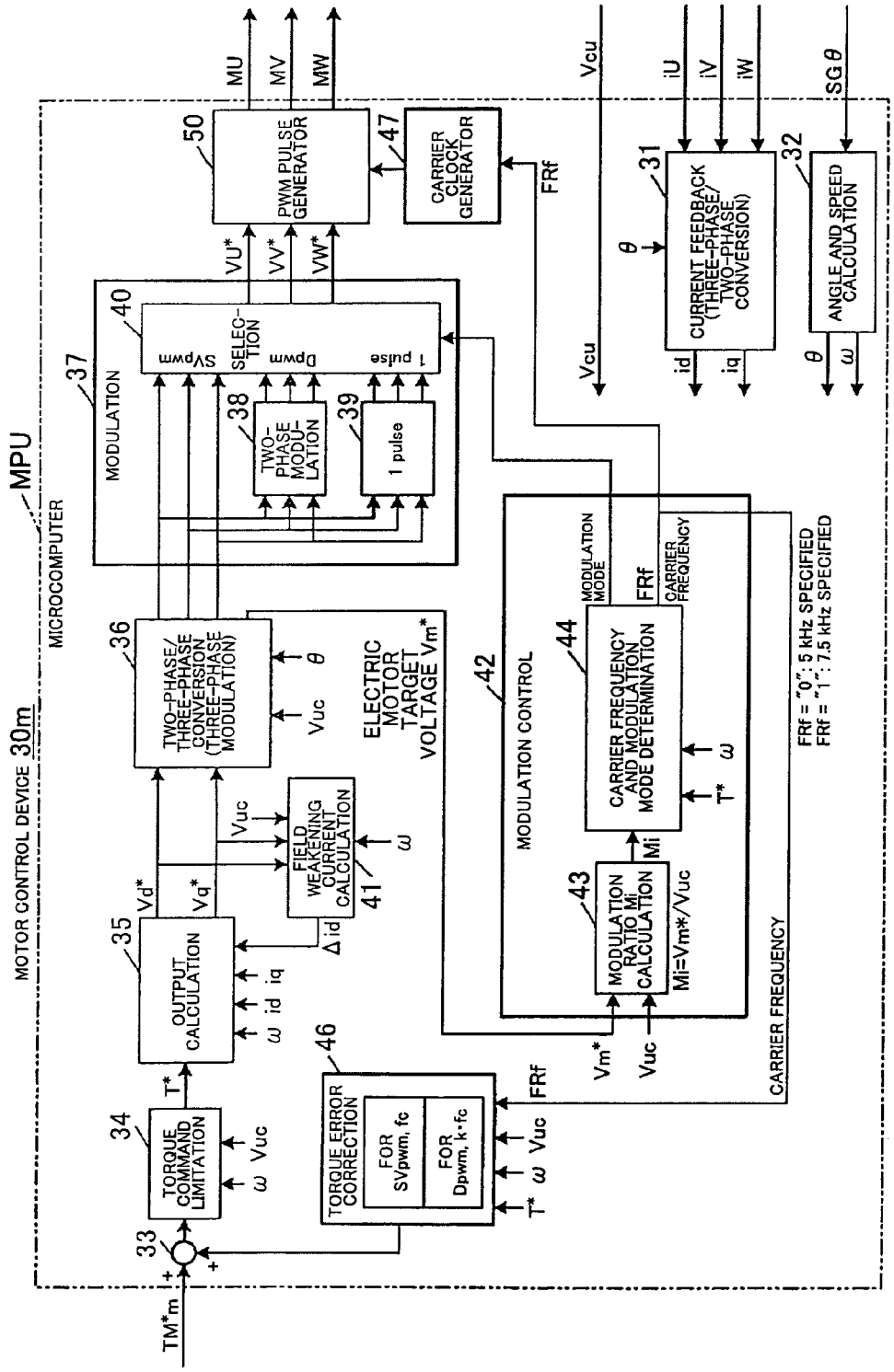
FIG. 2 is a block diagram showing an outline of a functional structure of a motor control device shown in FIG. 1.

Other purposes and features according to an aspect of the present invention will be made clear from the description of the embodiment below with reference to the drawings.

First Embodiment

FIG. 1 shows an outline of a first embodiment of the present invention. In the present embodiment, an electric motor 10$m$ is a permanent magnet type synchronous motor mounted on a vehicle for rotationally driving wheels. The electric motor 10$m$ has a rotor having a permanent magnet built therein and a stator having three phase coils 11 to 13 of U-phase, V-phase, and W-phase, respectively. A voltage type inverter 19$m$ supplies power from a battery 18 mounted on the vehicle to the electric motor 10$m$. A rotor of a resolver 17$m$ for detecting a magnetic pole position of the rotor is connected to the rotor of the electric motor 10$m$. The resolver 17$m$ generates an analogue voltage (rotational angle signal) SGθm representing a rotational angle of the rotor, and provides the analogue voltage to a motor control device 30$m$. A similar resolver 17$g$ is used for the electric motor 10$g$.

When power for vehicle electrical equipment is on, a primary-side capacitor 22 is connected to the battery 18 serving as an electric accumulator on the vehicle, which is a primary-side direct current power source together with the battery 18. A voltage sensor 21 provides a voltage detection signal Vdc representing a voltage of the primary-side capacitor 22 (voltage of the battery 18 on the vehicle) to a converter control device 30$v$. In the present embodiment, the voltage sensor 21 uses a voltage dividing resistor. An end of a reactor 61 of a converter 60 is connected to a positive pole (plus line) of the primary-side direct current power source.

The converter 60 has, in addition, a semiconductor switch 62 for voltage step-up serving as a switching element for voltage step-up to switch on and off between the other end of the reactor 61 and a negative pole (minus line) of the primary-side direct current power source, a semiconductor switch 63 for regeneration serving as a switching element for voltage step-down to switch on and off between a positive pole of a secondary-side capacitor 23 and the other end of the reactor 61, and diodes 64 and 65 connected in parallel to the semiconductor switches 62 and 63, respectively.

When the semiconductor switch 62 for voltage step-up is turned on (conductive), a current flows from the primary-side direct current power source (battery 18, primary-side capacitor 22) through the reactor 61 to the semiconductor switch 62, resulting in charging of the reactor 61; whereas, when the semiconductor switch 62 is turned off (nonconductive), the reactor 61 discharges a high voltage to the secondary-side capacitor 23 through the diode 65. That is, a higher voltage than the voltage of the primary-side direct current power source is induced to charge the secondary-side capacitor 23. The high voltage charging of the secondary-side capacitor 23 is continued by repeatedly turning on and off the semiconductor switch 62. That is, the secondary-side capacitor 23 is charged at the high voltage. Because the power accumulated by the reactor 61 increases corresponding to the length of the time during which the switch is on while repeating the turning on and off at a constant period, it is possible to adjust the rate (power supply rate for power running) at which the power is supplied from the primary-side direct current power source (battery 18, primary-side capacitor 22) through the converter 60 to the secondary-side capacitor 23, by adjusting the time during which the switch is on within the constant period (on duty: ratio of the time in which the switch is on to the constant period), that is, by PWM control.

When the semiconductor switch 63 for regeneration is turned on (conductive), the power accumulated in the secondary-side capacitor 23 is provided to the primary-side direct current power source (battery 18, primary-side capacitor 22) through the semiconductor switch 63 and the reactor 61 (reverse power supply: regeneration). Also in this case, it is possible to adjust the rate (power supply rate for regeneration) at which the power is reversely supplied from the secondary-side capacitor 23 through the converter 60 to the primary-side direct current power source (battery 18, primary-side capacitor 22), by adjusting the time during which the semiconductor switch 63 is on within the constant period, that is, by PWM control.

The voltage type inverter 19$m$ is provided with six switching transistors Tr1 to Tr6 that are turned on (conductive) to be driven through six sequences of drive signals generated in parallel by a drive circuit 20$m$ (similarly drive circuit 20$g$) to convert the direct current voltage of the secondary-side capacitor 23 (output voltage of the converter 60, that is, the secondary-side voltage) to three sequences of alternating current voltage with phase differences of $2\pi/3$ between the sequences, that is, to a three-phase alternating current voltage. The three sequences are then applied to the stator coils 11 to 13 of three phases (U-phase, V-phase and W-phase) of the electric motor 10$m$, respectively. As a result, phase currents iUm, iVm, and iWm flow into the stator coils 11 to 13, respectively, of the electric motor 10$m$, and then the rotor of the electric motor 10$m$ rotates. In order to increase a capacity of power supply for driving on and off (switching) the transistors Tr1 to Tr6 with PWM pulses and to suppress voltage surge, the secondary-side capacitor 23 of a large capacity is connected to a secondary-side output line of the converter 60 that serves as an input line of the inverter 19$m$. On the other hand, the primary-side capacitor 22 that is used to form the primary-side direct current power source is of small size, low cost, and small capacity, with the capacity significantly smaller than that of the secondary-side capacitor 23. On power supply lines connected to the stator coils 11 to 13 of the electric motor 10$m$, there are mounted current sensors 14$m$ to 16$m$ using hole ICs that detect the phase currents iUm, iVm, and iWm, respectively, to generate current detection signals (analogue voltages) to be provided to the motor control device 30$m$.

FIG. 2 shows a functional structure of the motor control device 30$m$. In the present embodiment, the motor control device 30$m$ is an electronic control device mainly formed of a microcomputer MPU, and includes the microcomputer MPU, the drive circuit 20$m$, the current sensors 14$m$ to 16$m$, the resolver 17$m$, the primary-side voltage sensor 21, and an unshown interface (signal processing circuit) between a secondary-side voltage sensor 24 and a secondary-side current sensor 24. The motor control device 30$m$ further includes an unshown interface (communication circuit) between the microcomputer and a main controller of an unshown vehicle drive control system on the vehicle. Note that the secondary-side voltage sensor 24 shown in FIG. 1 detects a secondary-side voltage Vuc (of the secondary-side capacitor 23), and provides the voltage signal Vuc representing thereof to the motor control devices 30$m$ and 30$g$.

Referring to FIG. 2, it is seen that the microcomputer in the motor control device 30$m$ calculates a rotational angle (magnetic pole position) θm and a rotational speed (angular velocity) ωm of the rotor of the electric motor 10*m*, based on the rotational angle signal SGθm provided by the resolver 17*m*.

Note that, although the rotational angle of the rotor of the electric motor 10*m* is not exactly the same as the magnetic pole position, they are in a proportional relation, and the coefficient of proportionality is determined by the number of magnetic poles p of the electric motor 10*m*. In addition, although the rotational speed is not the same as the angular velocity, they are also in a proportional relation, and the coefficient of proportionality is determined by the number of magnetic poles p of the electric motor 10*m*. In the present document, the rotational angle θm means the magnetic pole position. The rotational speed ωm means the angular velocity, but sometimes means the rotational speed.

The microcomputer of the motor control device 30*m* performs feedback control by conducting a vector control calculation on a known d–q axis model in which the d-axis coincides the direction of a pair of magnetic poles in the rotor of the electric motor 10*m* and the q-axis is set to be perpendicular to the d-axis, in "output calculation" 35. The microcomputer converts to digital and reads the current detection signals iUm, iVm and iWm of the current sensors 14*m* to 16*m*, respectively, and in current feedback calculation, converts the three-phase current values iUm, iVm and iWm on the fixed coordinates to two-phase current values idm and iqm on the d-axis and the q-axis, respectively, of the rotating coordinates, using a three-phase/two-phase conversion that is a known fixed/rotating coordinate transformation.

An unshown main controller of the vehicle drive control system provides a motor target torque TM*m to the microcomputer of the motor control device 30*m*. Note that the main controller calculates a required vehicle torque TO*m based on the vehicle speed and the accelerator pedal opening of the vehicle, and corresponding to the required vehicle torque TO*m, generates the motor target torque TM*m that is then provided to the microcomputer. The microcomputer provides the rotational speed corn of the electric motor 10*m* as an output to the main controller.

The microcomputer of the motor control device 30*m* adds a torque correction value to be described later to the motor target torque TM*m at a summing point 33. Then, in a torque command limitation 34, the microcomputer of the motor control device 30*m* reads a limit torque TM*mmax corresponding to the secondary-side voltage Vuc and the rotational speed ωm from a limit torque table (look-up table), and sets the TM*mmax as the target torque T*m if the motor target torque TM*m corrected by the summing point 33 exceeds the TM*mmax. The motor target torque TM*m corrected by the summing point 33 is set as the target torque T*m if the corrected motor target torque TM*m is equal to or less than the TM*mmax. The motor target torque T*m thus generated through the above-described limitation is provided to the output calculation 35.

Note that the limit torque table is a memory area in which the values of the secondary side voltage Vuc and the speed corn within the variable range of the secondary-side voltage Vuc and the range of the rotational speed ωm, respectively, are used as addresses, and at each of the address values, the maximum torque that can be generated by the electric motor 10*m* is written as the limit torque TM*mmax. Note also that the memory area represents a memory area of an unshown RAM in the microcomputer, in the present embodiment. The higher the secondary-side voltage Vuc is, the larger the limit torque TM*mmax is, whereas the lower the secondary-side voltage Vuc is, the smaller the limit torque TM*mmax is. Also, the lower the rotational speed ωm is, the larger the limit torque TM*mmax is, whereas the higher the rotational speed ωm is, the smaller the limit torque TM*mmax is.

The microcomputer described above contains a nonvolatile memory in which the data TM*mmax of the limit torque table is written, and from the nonvolatile memory, the microcomputer reads the data to write it into the RAM in the process in which an operating voltage is applied to the microcomputer to initialize itself and a motor drive system shown in FIG. 1. The microcomputer contains a plurality of other similar look-up tables that also represent, similarly to the limit torque table, memory areas in the RAM in which the reference data stored in the nonvolatile memory are written, as described later.

The output calculation 35 includes a first high-efficiency torque curve table A that serves as a look-up table. The first high-efficiency torque curve table A is written with the d-axis current values id each of which corresponds to the motor speed corn and the motor target torque T*m for generating each of the target torques T*m at each respective motor speed.

The output torque of the electric motor is determined corresponding to each respective value of the d-axis current id and the q-axis current iq. There are infinite number of combinations of the id and the iq for producing the same output torque corresponding to a single rotational speed value, that is, at the same motor rotational speed, and the combinations of the id and the iq lie on a constant torque curve. There is a combination of the id and iq with the maximum power use efficiency (minimum power consumption) on the constant torque curve, and that combination represents a high-efficiency torque point. A curve connecting the high-efficiency torque points on a plurality of the torque curves is the high-efficiency torque curve which exists corresponding to each rotational speed. By setting the target current values to the d-axis current id and the q-axis current iq corresponding to the position of a given value of the motor target torque T*m on the high-efficiency torque curve for a motor rotational speed, and energizing the electric motor 10*m* based on the target current, the electric motor 10*m* produces an output torque of the target value T*m with a high power use efficiency for the motor energization.

In the present embodiment, the high-efficiency torque curve is divided into two lines, that is, a first high-efficiency torque curve A that represents the d-axis value, and a second high-efficiency torque curve B that represents the q-axis value. The first high-efficiency torque curve A includes a pair of curves applied to a power running region and a regeneration region, respectively, both representing the d-axis target current with respect to the motor rotational speed and the target torque.

The first high-efficiency torque curve table A is a memory area in which the d-axis target current corresponding to the target torque T*m for generating the target torque with a minimum power consumption is written, and is composed of a pair of a power running table A1 for power running and a regeneration table A2 for regeneration. According to the result of the judgment whether the case is the power running or the regeneration based on the rotational speed ωm of the electric motor and the target torque T*m given, it is determined which of the table for power running or the table for regeneration is to be used.

Note that as the rotational speed ωm of the electric motor 10*m* increases, back electromotive forces generated in the stator coils 11 to 13 are increased to raise terminal voltages of the coils 11 to 13. Accordingly, it becomes difficult to supply the target current from the inverter 19*m* to the coils 11 to 13, thus failing to obtain the targeted torque output. In this case, the target torque T*m can be output by reducing the d-axis current id and the q-axis current iq by Δid and Δiq, respectively, along the constant torque curve for the motor target torque T*m given, though the power use efficiency is reduced. This is called a field weakening control. The d-axis field weakening current Δid is generated by field adjustment amount calculation so as to be used to calculate a d-axis current command and a q-axis current command. The d-axis weakening magnetic field current Δid is calculated by a field weakening current calculation 41. The details thereof will be described later.

In the calculation of the d-axis current command in the "output calculation" 35, the microcomputer MPU calculates a d-axis target current id* by subtracting the d-axis field weakening current Δid from the d-axis current value id that has been read from the first high-efficiency torque curve table A corresponding to the target torque T*m determined by the torque command limitation.

$$id^* = id - \Delta id \quad (1)$$

In the calculation of the q-axis current command, a second high-efficiency torque curve table B in the output calculation 35 is used. The second high-efficiency torque curve B representing the q-axis value of the high-efficiency torque curve is corrected into a curve representing a q-axis target current that is obtained by subtracting the q-axis field weakening current Δiq paired with the d-axis field weakening current Δid. The data of the second high-efficiency torque curve B after corrected is stored in the second high-efficiency torque curve table B.

The second high-efficiency torque curve table B is a memory area in which the d-axis target current corresponding to the target torque T*m and the d-axis field weakening current Δid for generating the target torque with a minimum power consumption, that is, the target current on the second high-efficiency torque curve B after corrected, is written, and is also composed of a pair of a power running table B1 for power running and a regeneration table B2 for regeneration. According to the result of the judgment whether the case is the power running or the regeneration based on the rotational speed corn of the electric motor and the target torque T*m, it is determined which of the table for power running or the table for regeneration is to be used.

In the calculation of the q-axis current command, the q-axis target current iq* corresponding to the target torque T*m and the d-axis field weakening current Δid is read from the second high-efficiency torque curve table B and used as the q-axis current command.

In the output calculation 35, the microcomputer of the motor control device 30m calculates a current deviation δid between the d-axis target current id* and the d-axis current value id, and a current deviation δiq between the q-axis target current iq* and the q-axis current value iq, and then based on the current deviations δid and δiq, performs proportional control and integral control (PI calculation of feedback control). That is, the microcomputer of the motor control device 30m calculates a voltage reduction Vzdp representing a voltage command value for a proportional component and a voltage reduction Vzdi representing a voltage command value for an integral component, based on the current deviation δid, and by summing the voltage reductions Vzdp and Vzdi, calculates a voltage reduction Vzd as follows.

$$Vzd = Vzdp + Vzdi \quad (2)$$

In addition, the output calculation 35 reads the rotational speed ω, and the q-axis current iq, and based on the rotational speed ω, the q-axis current iq, and a q-axis inductance Lq, calculates an induced voltage ed that is induced by the q-axis current iq, as follows.

$$ed = \omega m \cdot Lq \cdot iq \quad (3)$$

Then, by subtracting the induced voltage ed from the voltage reduction Vzd, the output calculation 35 also calculates a d-axis voltage command value vd* serving as an output voltage, as follows.

$$\begin{aligned}vd^* &= Vzd - ed \\ &= Vzd - \omega m \cdot Lq \cdot iq\end{aligned} \quad (4)$$

The output calculation 35 also calculates a voltage reduction Vzqp representing a voltage command value for a proportional component and a voltage reduction Vzqi representing a voltage command value for an integral component, based on the current deviation δiq, and by summing the voltage reductions Vzqp and Vzqi, calculates a voltage reduction Vzq as follows.

$$Vzq = Vzqp + Vzqi$$

Moreover, based on the rotational speed ω, a back electromotive force constant MIf, the d-axis current id, and an inductance Ld on the d-axis, the output calculation 35 calculates an induced voltage eq that is induced by the d-axis current id, as follows.

$$eq = \omega m(MIf + Ld \cdot id) \quad (5)$$

Then, by adding the induced voltage eq to the voltage reduction Vzq, the output calculation 35 also calculates a q-axis voltage command value vq* serving as an output voltage, as follows.

$$\begin{aligned}vq^* &= Vzq + eq \\ &= Vzq + \omega m(MIf + Ld \cdot id)\end{aligned} \quad (6)$$

Next, a two-phase/three-phase conversion 36 serving as rotating/fixed coordinate transformation converts target voltages vd* and vq* on the rotating coordinate system to target voltages VU*, VV*, and VW* for respective phases on the fixed coordinate system, according to the two-phase/three-phase conversion. The target voltages VU*, VV*, and VW* for respective phases are sent to a PWM pulse generator 50 through a modulation 37 when the voltage control mode is the three-phase modulation mode. When the voltage control mode is the two-phase modulation mode, the target voltages VU*, VV*, and VW* for respective phases in the three-phase modulation mode are converted to voltages of the two-phase modulation in a two-phase modulation 38 of the modulation 37, and sent to the PWM pulse generator 50. When the voltage control mode is a 1 pulse mode in which all phases are energized by rectangular waves, target voltages VU* VV*, and VW* for respective phases in the three-phase modulation mode are converted to phase voltages energizing with rectangular waves by 1 pulse conversion using the 1 pulse 39 in the modulation 37, and provided to the PWM pulse generator 50.

The PWM pulse generator 50 that has been provided with the three-phase target voltages VU*, VV*, and VW* converts them for outputting the voltage values thereof to PWM pulses MUm, Mvm, and MWm, respectively, that have the frequency (carrier frequency) synchronized with a low-frequency (5 kHz) or high-frequency (7.5 kHz) clock provided by a carrier clock generator 47, and provides the PWM pulses Mum, MVm, and MWm as output to the drive circuit 20m shown in FIG. 1. The drive circuit 20m generates the six sequences of drive signals in parallel based on the PWM pulses MUm, MVm, and MWm, and switches on and off the transistors Tr1 to Tr6 of the voltage type inverter 19m through the drive signals of the respective sequences. As a result, the VU*, VV*, and VW* are applied to the stator coils 11 to 13, respectively, of the electric motor 10m to flow the phase currents iUm, iVm, and iWm. The PWM pulse generator that has been provided with target voltages for respective phases in the two-phase modulation mode generates two phases of PWM pulses and the remaining one phase of an on or off signal (constant voltage output). If provided with target voltages for respective phases in the 1 pulse modulation mode, the PWM pulse generator outputs energizing interval signals that energize the respective phases with rectangular waves.

The field weakening current calculation 41 calculates a voltage saturation indicator m that is a parameter for the field weakening control. That is, based on the d-axis voltage command value vd* and the q-axis voltage command value vq*, the field weakening current calculation 41 calculates a voltage saturation judgment indicator mi as a value representing a degree of voltage saturation, as follows.

$$mi = \sqrt{(vd^{*2} + vq^{*2})}/Vuc \quad (7)$$

Then, the field weakening current calculation 41 subtracts a constant kv from the voltage saturation judgment indicator mi to obtain a calculated voltage saturation value ΔV, where, denoting a threshold value representing the maximum output voltage of the inverter 19m as a comparative value Vmax, the constant kv is given by the following equation.

$$V\text{max} = kv \cdot Vuc \quad (8)$$

The calculated voltage saturation value ΔV is given as follows.

$$\Delta V = mi - kv \quad (9)$$

Then, the field weakening current calculation 41 calculates a field adjustment amount.

In the calculation of the field adjustment amount, the ΔV is summed up to obtain a sum ΣΔV. If the sum ΣΔV has a positive value, the sum ΣΔV is multiplied by a proportionality constant to calculate the d-axis field weakening current Δid as a positive set value for performing the field weakening control. If the calculated voltage saturation value ΔV or the sum ΣΔV has a negative value, the adjustment value Δid and the sum ΣΔV are made to be zero. The adjustment value Δid is used in the calculation of the d-axis current command and in the calculation of the q-axis current command.

The "two-phase/three-phase conversion" 36 calculates an electric motor target voltage Vm* in the process of the two-phase/three-phase conversion. The calculation formula is Vm*=√(Vd*²+Vq*²). From the electric motor target voltage Vm* and the voltage Vuc of the secondary-side capacitor 23 (voltage value detected by the voltage sensor 24), a modulation ratio calculation 43 in a modulation control 42 calculates a modulation ratio Mi as follows.

$$Mi = Vm^*/Vuc \quad (10)$$

A carrier frequency and modulation mode determination 44 determines the carrier frequency and the modulation mode based on the target torque T* of the electric motor 10m, the rotational speed ω, and the modulation ratio Mi. The carrier frequency and modulation mode determination 44 commands the carrier clock generator 47 to produce an output of the determined carrier frequency, and depending on the determined modulation mode, commands a selection 40 in the modulation 37 to produce a target voltage output for the modulation mode. The carrier frequency and modulation mode determination 44 also provides the carrier frequency and the modulation mode determined to a torque error correction 46.

During a first transition in which the carrier frequency is switched from a low frequency fc to a high frequency k·fc and the voltage control mode is switched from the three-phase modulation mode to the two-phase modulation mode, the torque error correction 46 reads a first torque correction value that is used for reducing a torque step between before and after the switching and that is allocated to the current target torque T* and rotational speed ω of the electric motor 10m in a look-up table for first transition (for Dpwm, k·fc), and adds the first torque correction value to the torque command value TM*m at the summing point 33. During a second transition for switching in the opposite direction to the above (transition from the k·fc and two-phase modulation to the fc and three-phase modulation), the torque error correction 46 reads a second torque correction value that is used for reducing a torque step between before and after the switching and that is allocated to the current target torque T* and rotational speed ω of the electric motor 10m in a look-up table for the second transition (for SVpwm, fc), and adds the second torque correction value to the torque command value TM*m at the summing point 33. After the correction has been made as described above, the process from the torque command limitation 34 to the two-phase/three-phase conversion 36 is performed again, and then the modulation 37 outputs the target voltages for respective phases in the modulation mode that has been determined by the carrier frequency and modulation mode determination 44. Note that the switching of the target voltages for respective phases is suspended from the time when the first transition or the second transition has occurred until the recalculation process from the torque command limitation 34 to the two-phase/three-phase conversion 36 is finished.

The microcomputer MPU shown in FIG. 2 is provided not only with a CPU but also a RAM, a ROM, and a flash memory for recording data and various programs. The programs, reference data, and look-up tables stored in the ROM or the flash memory are written into the RAM, and based on the programs, the input processing, calculation, and output processing in the block enclosed by the two-dot chain line are executed.

Figure 3:
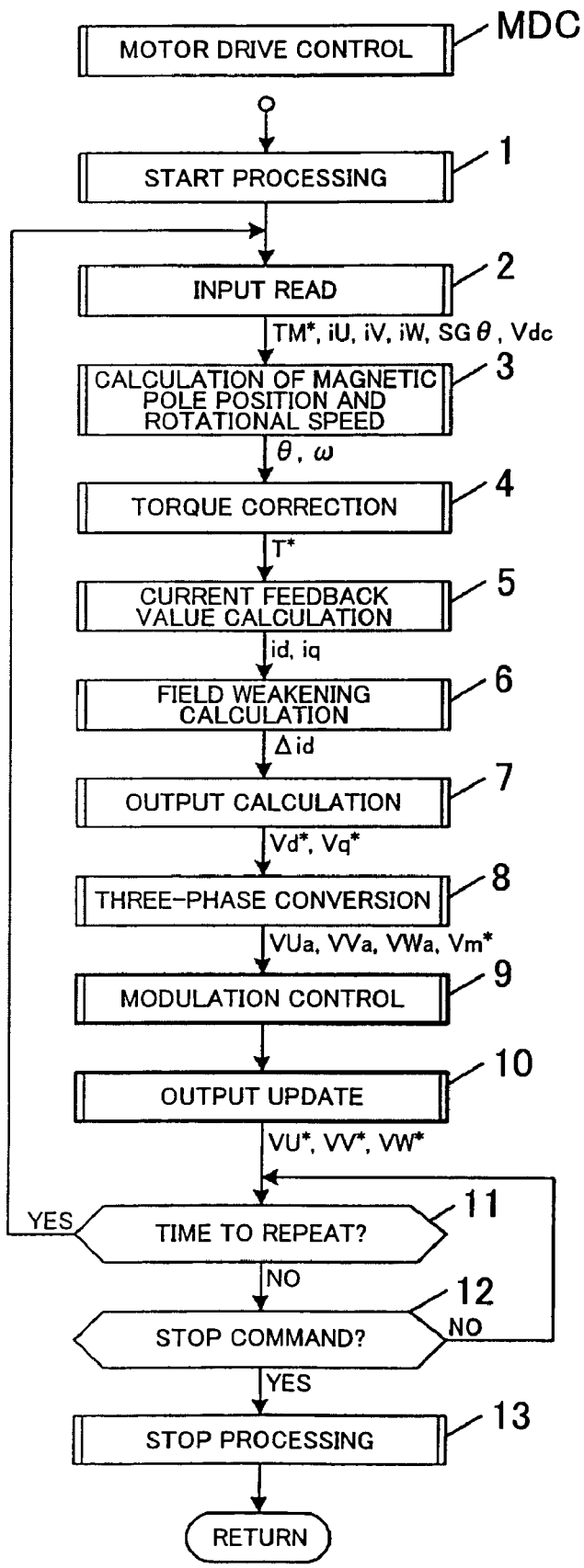
FIG. 3 is a flow chart showing an outline of motor control by a microcomputer shown in FIG. 2.

FIG. 3 shows an outline of motor drive control MDC executed by (the CPU of) the microcomputer MPU based on the programs. When an operating voltage is applied, the microcomputer MPU initializes itself, the PWM pulse generator 50, the carrier clock generator 47, and the drive circuit 20m, and sets the inverter 19m for driving the electric motor 10m in the stop and standby state. Then, the microcomputer MPU waits for a motor drive start command from the unshown main controller of the vehicle drive control system. When the motor drive start command is given, the microcomputer MPU sets initial values for the electric motor control in the internal registers in "start processing" (step 1), and reads input signals or data in "input read" (step 2). That is, the microcomputer MPU converts to digital and reads the first target torque TM*m given by the main controller, the respective phase currents iU, iV, and iW detected by the current sensors 14m to 16m, the rotational angle signal SGθm of the resolver 17m, and the voltages Vdc and Vuc detected by the voltage sensors 21 and 24, respectively.

Note that only the step number will be shown in parentheses with the word "step" omitted in the description below.

Next, the microcomputer MPU calculates the rotational angle θ and the rotational speed ω based on the rotational angle signal SGθ (rotational angle data SGθ) that has been read (3). This function is shown as an angle and speed calculation 32 in FIG. 2. Next, the microcomputer MPU reads from the limit torque table the limit torque TM*max corresponding to the motor target torque TM* read, the direct current voltage Vuc read, and the rotational speed ω calculated, and if the motor target torque TM* read exceeds the TM*max, determines the TM*max as the target torque T*. If the motor target torque TM* is equal to or less than the TM*max, the motor target torque TM read is determined as the target torque T* (4). This function is shown as the torque command limitation 34 in FIG. 2. Next, the microcomputer MPU converts the detected three-phase currents iU, iV, and iW that have been read to the two-phase d-axis current value id and the q-axis current value iq using the three-phase/two-phase conversion (5). This function is shown as a current feedback 31 in FIG. 2. Next, the microcomputer MPU calculates the d-axis field weakening current Δid for performing d-axis field weakening control (6). This function is shown as the field weakening current calculation 41 in FIG. 2.

The contents of "output calculation" (7) are the same as the contents of the above-described output calculation 35 shown in FIG. 2. The voltage target values Vd* and Vq on the d- and q-axes calculated in the "output calculation" (7) are converted to the target voltages VU*, VV*, and VW* for respective phases in the three-phase modulation mode (8). At this time, the electric motor target voltage Vm* is also calculated. A next step, "modulation control" (9), calculates the modulation ratio Mi, and determines the carrier frequency and the modulation mode based on the modulation ratio Mi, the target torque T*, and the rotational speed ω.

Figure 4:
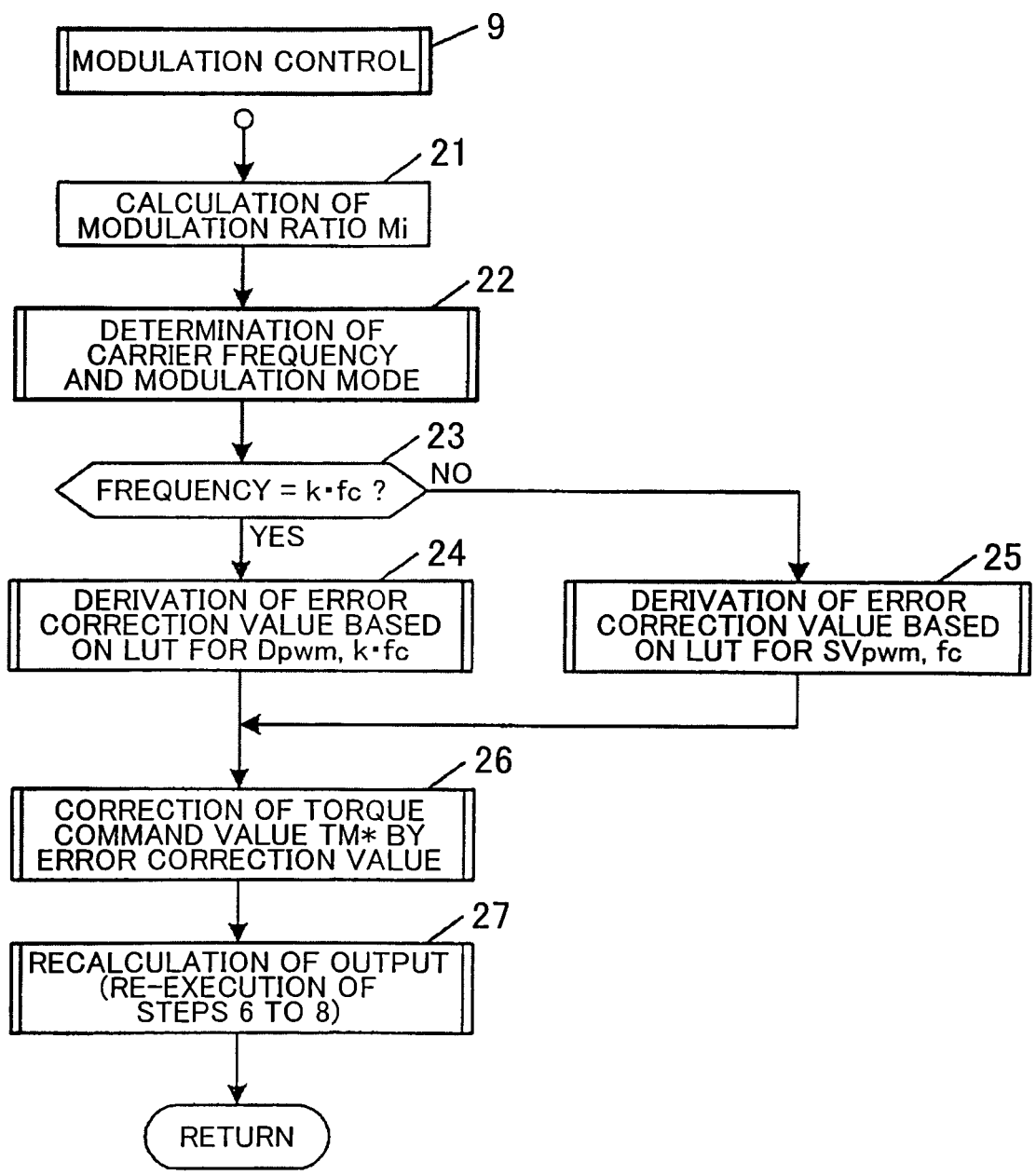
FIG. 4 is a flow chart showing details of "modulation control" shown in FIG. 3.

FIG. 4 shows details of the "modulation control" (9). This step calculates the modulation ratio Mi=Vm*/Vuc (21), and determines the carrier frequency and the modulation mode based on the target torque T* and the rotational speed ω of the electric motor 10m, and the modulation ratio Mi (22). The details of the "determination of carrier frequency and modulation mode" (22) will be described later with reference to FIGS. 6 to 9. If the carrier frequency determined defers from the carrier frequency currently being output so that the frequency is to be switched from the low frequency fc (5 kHz) to the high frequency k·fc (7.5 kHz, that is, k=1.5 in the present embodiment), the correction value that is used for reducing the output torque step caused by the switching and that is allocated to the current target torque and rotational speed is read from the look-up table for two-phase modulation, high frequency (for Dpwm, k·fc) (24). Then, the torque command value TM* is corrected by the amount of the correction value that has been read (26), and based on the corrected torque command value, the steps 6 to 8 are executed again to recalculate the target voltages (instantaneous values) VU*, VV*, and VW* for respective phases in the three-phase modulation mode (27). If the carrier frequency determined defers from the carrier frequency currently being output so that the frequency is to be switched from the high frequency k·fc (7.5 kHz) to the low frequency fc (5 kHz), the correction value that is used for reducing the output torque step caused by the switching and that is allocated to the current target torque and rotational speed is read from the look-up table for three-phase modulation, low frequency (for SVpwm, fc) (25). Then, the torque command value TM* is corrected by the amount of the correction value that has been read (26), and based on the corrected torque command value, the steps 6 to 8 are executed again to recalculate the target voltages VU*, VV*, and VW* for respective phases in the three-phase modulation mode (27).

Refer again to FIG. 3. A next step "output update" (10) sends the target voltages for respective phases in the modulation mode determined in the modulation control (9) as output to the PWM pulse generator 50, and commands the carrier clock generator 47 to produce an output of the determined carrier frequency. Next, after a period of time waiting for the timing for next repetitive processing (11), the process proceeds to the "input read" (2) again. Then, the above-described "input read" (2) and the later processes are executed. If a stop command is issued from a system controller while waiting for the timing for next repetitive processing, the microcomputer MPU stops the output for energizing the motor rotation (13) at that time.

Figure 5:
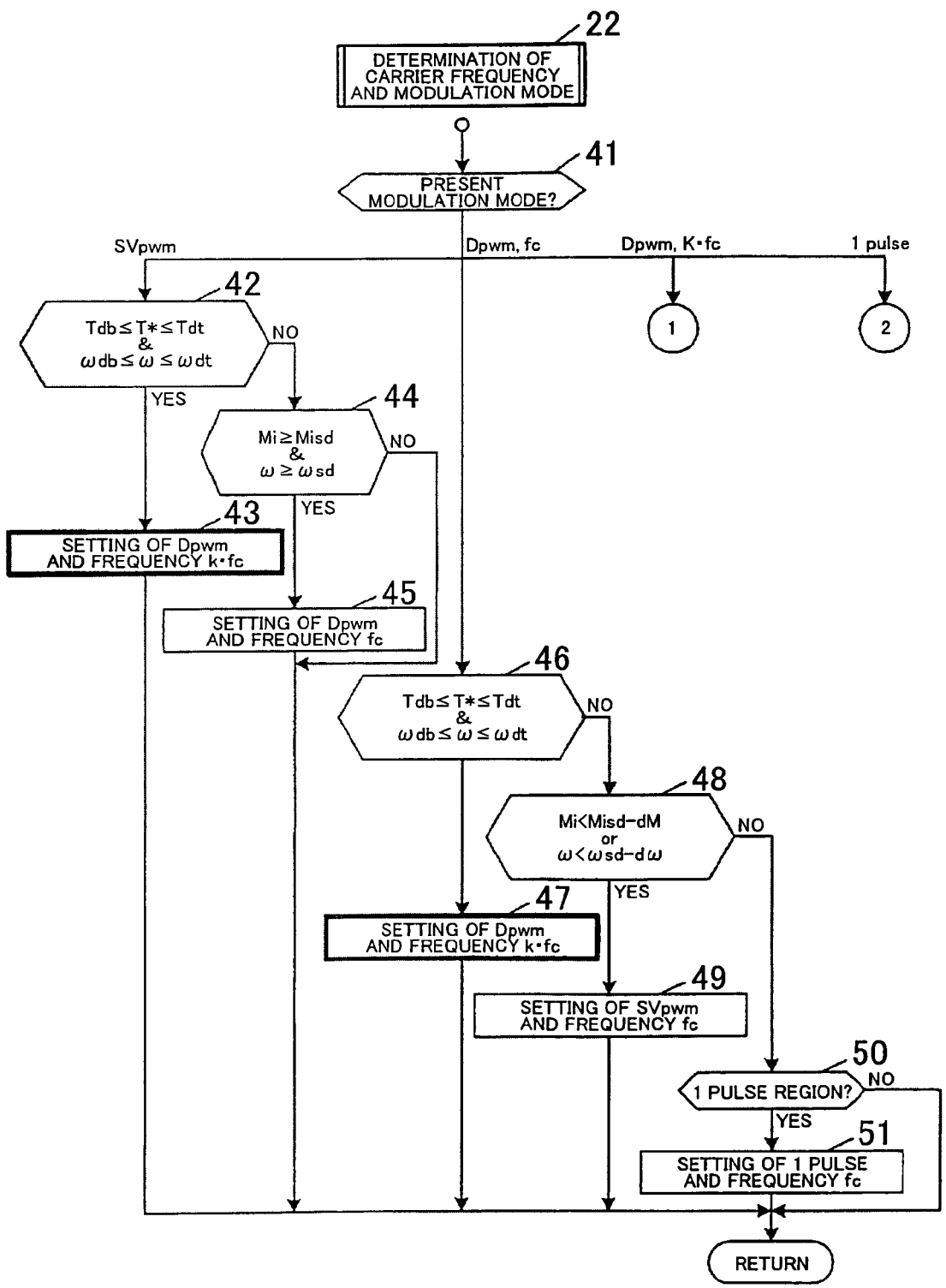
FIG. 5 is a flow chart showing a first half of details of "determination of carrier frequency and modulation mode" shown in FIG. 4.

Refer to FIG. 5. In the "determination of carrier frequency and modulation mode" (22), if the present modulation mode is the SVpwm (three-phase modulation mode, low frequency fc) (41), a look-up is performed to determine whether the target torque and the rotational speed are in A (FIGS. 7 to 9) in a first region (region for switching to high frequency) in which the carrier frequency is to be the high frequency k·fc (42). If the target torque and the rotational speed are in the A in the first region, the carrier frequency is determined to be the high frequency k·fc, and in accordance with that, the voltage control mode is switched from the three-phase modulation mode (SVpwm) to the two-phase modulation mode (43). If the target torque and the rotational speed are outside of the A, a look-up is performed to determine whether a condition is satisfied for switching from the three-phase modulation to the two-phase modulation while keeping the low frequency fc (44). If the condition is satisfied, the modulation mode is switched from the three-phase modulation to the two-phase modulation (Dpwm) while keeping the low frequency fc (45).

If the present modulation mode is the Dpwm (two-phase modulation mode, low frequency fc), a look-up is performed to determine whether the target torque and the rotational speed are in B (FIGS. 7 to 9) in the first region in which the carrier frequency is to be the high frequency k·fc (46). If the target torque and the rotational speed are in the B, the carrier frequency is determined to be the high frequency k·fc (47). The voltage control mode is continued to be the two-phase modulation mode. If the target torque and the rotational speed are outside of the B, a look-up is performed to determine whether a condition is satisfied for switching from the two-phase modulation to the three-phase modulation (SVpwm) while keeping the low frequency fc (48). If the condition is satisfied, the modulation mode is switched from the two-phase modulation (Dpwm) to the three-phase modulation (SVpwm) while keeping the low frequency fc (49). If the condition for switching to the three-phase modulation (SVpwm) is not satisfied, a look-up is performed to determine whether a condition is satisfied for making the voltage control mode to be the 1 pulse mode (50). If the condition is satisfied, the voltage control mode is switched to the 1 pulse mode (51).

Figure 6:
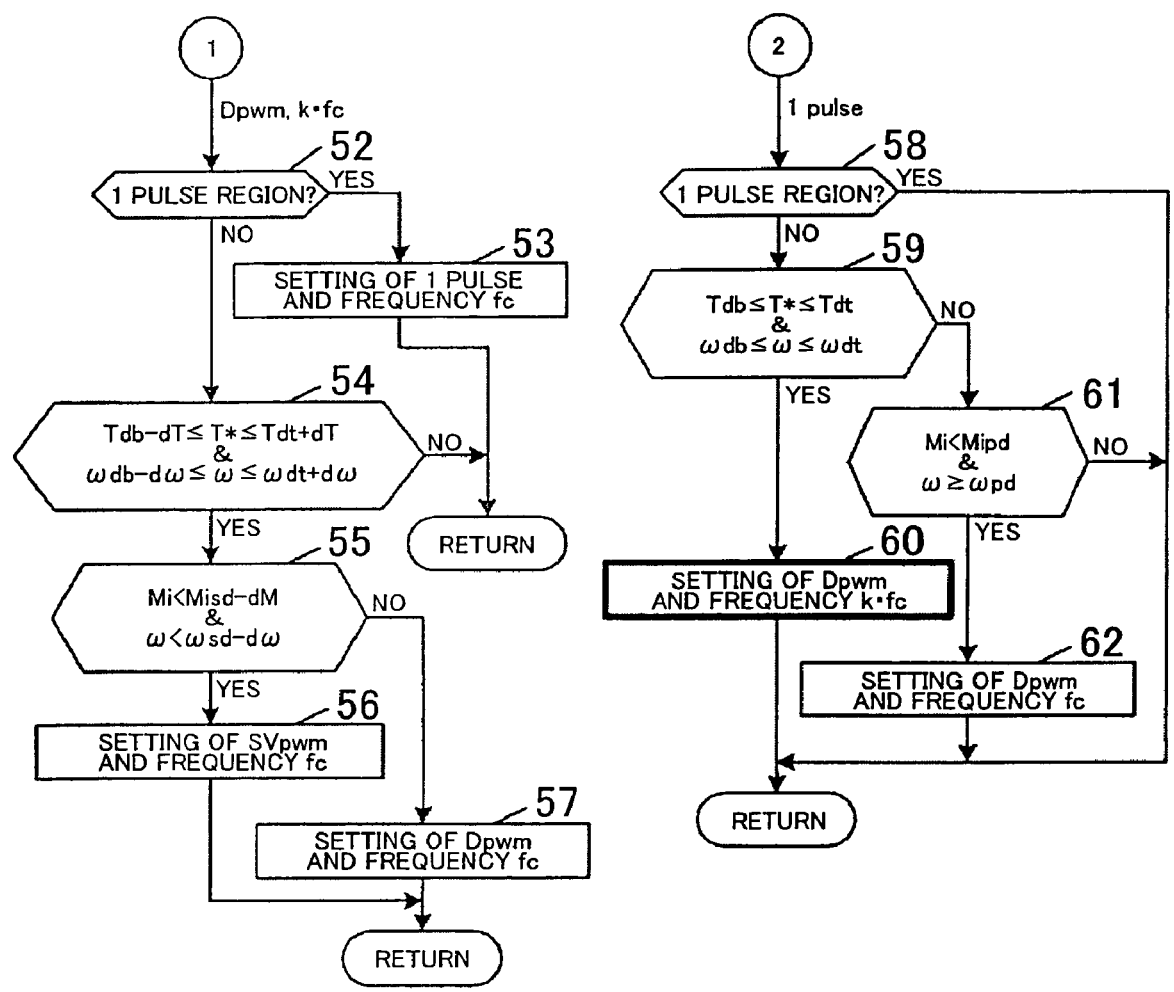
FIG. 6 is a flow chart showing a second half of details of "determination of carrier frequency and modulation mode" shown in FIG. 4.
Figure 7:
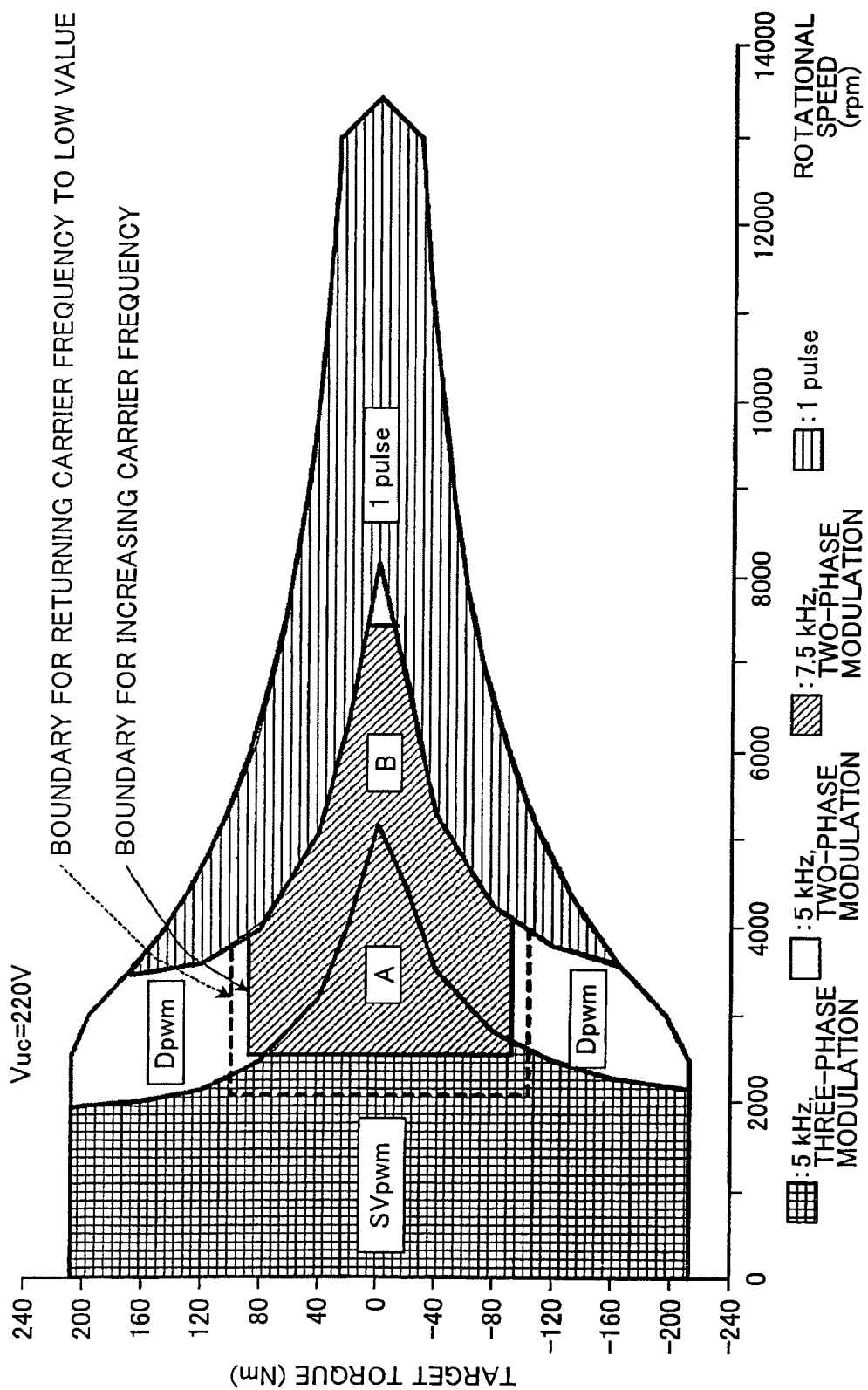
FIG. 7 is a graph with coordinate axes representing target torque and rotational speed of an electric motor, the graph showing a first region (A+B) in which a high carrier frequency is employed, a boundary (dotted line) of a region in which the high carrier frequency is canceled, and modulation mode regions, FIG. 7 being applied to a case in which a secondary-side voltage Vuc of a converter is 220 V.
Figure 8:
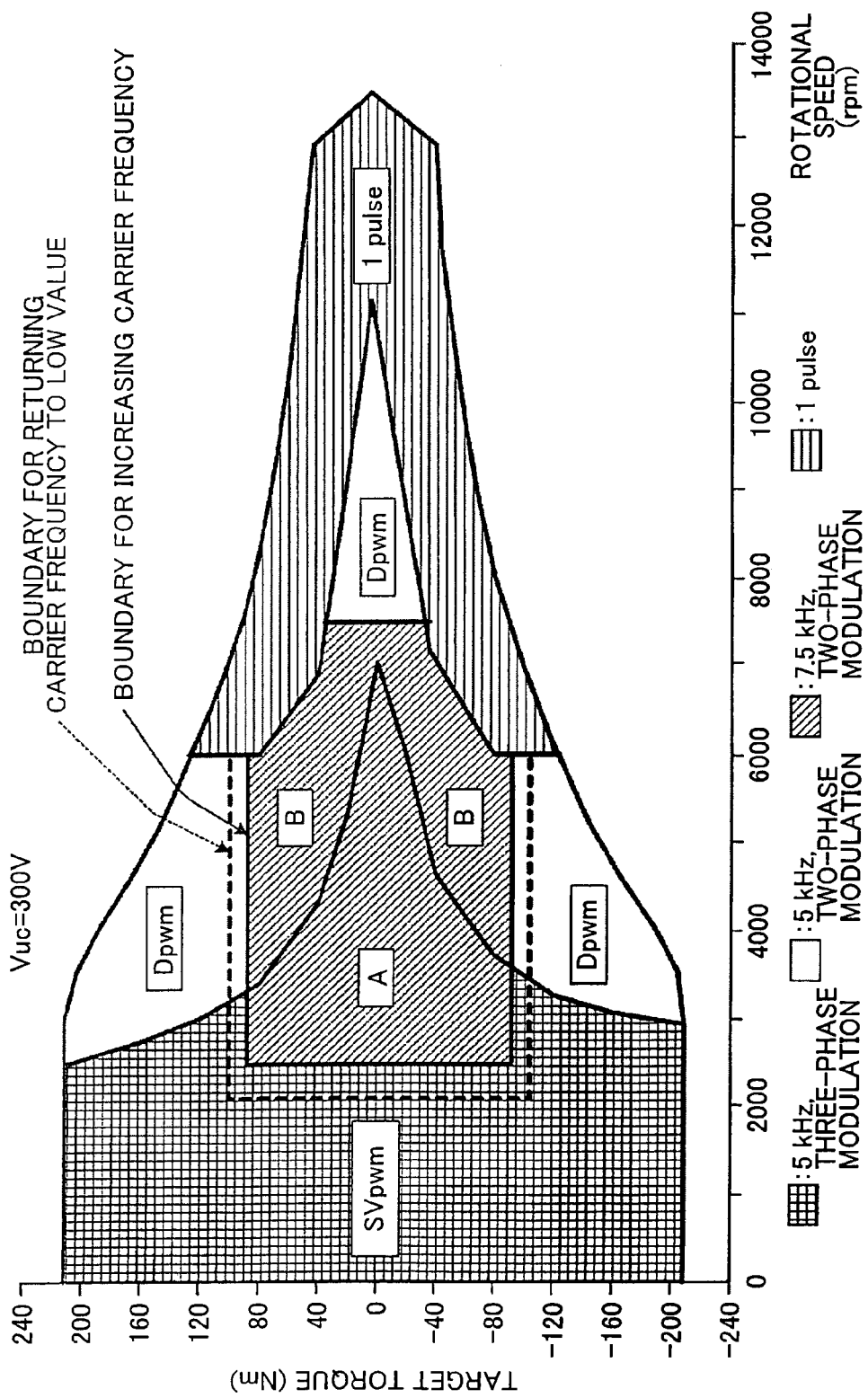
FIG. 8 is a graph showing the first region (A+B) in which the high carrier frequency is employed, the boundary (dotted line) of the region in which the high carrier frequency is canceled, and the modulation mode regions, FIG. 8 being applied to a case in which the secondary-side voltage Vuc of the converter is 300 V.
Figure 9:
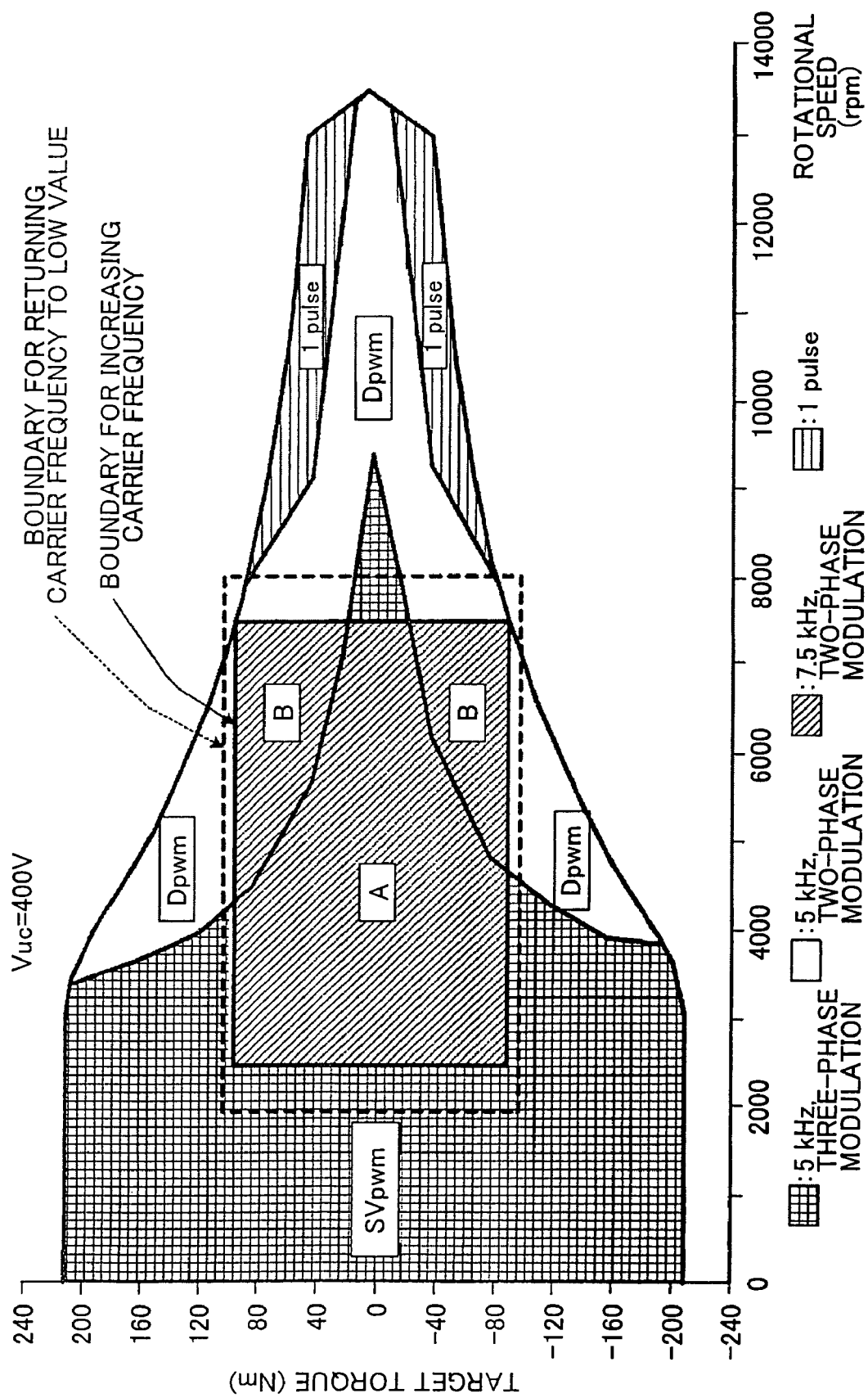
FIG. 9 is a graph showing the first region (A+B) in which the high carrier frequency is employed, the boundary (dotted line) of the region in which the high carrier frequency is canceled, and the modulation mode regions, FIG. 9 being applied to a case in which the secondary-side voltage Vuc of the converter is 400 V.

Next, refer also to FIG. 6. If the present modulation mode is that of the A or the B (two-phase modulation mode, high frequency k·fc), a look-up is performed to determine whether a condition is satisfied for making the voltage control mode to be the 1 pulse mode (52). If the condition is satisfied, the voltage control mode is switched to the 1 pulse mode (53). If the condition for the 1 pulse mode is not satisfied, a look-up is performed to determine whether the target torque and the rotational speed are outside of a second region (region for switching to low frequency, that is, region for canceling high frequency) that is indicated by the dotted line outside of the first region shown in FIGS. 7 to 9 (54). If the target torque and the rotational speed are outside of the second region, the high frequency needs to be cancelled. Therefore, a look-up is performed to determine whether the target torque and the rotational speed are in the three-phase modulation region (55), and if the result is affirmative, the three-phase modulation mode and the low frequency fc (SVpwm) are set (56). If the target torque and the rotational speed are not in the three-phase modulation region, the two-phase modulation mode and the low frequency (Dpwm) are set (57).

If the present modulation mode is the 1 pulse mode (58), a look-up is performed to determine whether a condition is satisfied for making the carrier frequency to be the high frequency (59). If the condition is satisfied, the carrier frequency is determined to be the high frequency k·fc, and in conjunction with that, the two-phase modulation mode (A or B) is set as the voltage control mode (60). If the condition for the high frequency is not satisfied, a look-up is performed to determine whether a condition is satisfied for making the modulation mode and the carrier frequency to be the two-phase modulation mode and the low frequency fc (Dpwm) (61). If the condition is satisfied, the two-phase modulation and the low frequency fc (Dpwm) are set (62).

The regional sections "SVpwm" (three-phase modulation, low frequency fc), "A, B" (two-phase modulation, high frequency k·fc), "Dpwm" (two-phase modulation, low frequency fc), and "1 pulse" (all-phase rectangular wave energization) described above are shown in FIGS. 7, 8, and 9 in the cases that the secondary-side voltage Vuc of the converter 60 detected by the voltage sensor 24 are 220 V, 300 V, and 400 V, respectively. The region "A" is a region in which the three-phase modulation is employed if the carrier frequency is kept at the same frequency (fc), but the two-phase modulation is employed to reduce a switching loss caused by the switching to the high frequency in conjunction with the switching of the carrier frequency from the low frequency fc to the high frequency k·fc for the purpose of reduction of side band noise. The region "B" is a region in which two-phase modulation is employed to reduce a switching loss and in which the carrier frequency is switched from the low frequency fc to the high frequency k·fc to reduce the side band noise.

The memory of the microcomputer MPU stores the reference values shown in FIGS. 5 and 6, including the reference values (threshold values) for low/high switching and high/low switching of the carrier frequency, and the reference values for modulation switching, in each division of the range of the secondary-side voltage Vuc so as to form a reference data table (LUT, that is, a look-up table), and the microcomputer MPU uses the above-mentioned reference values, reading them from the LUT corresponding to the Vuc values at the time when executing the "determination of carrier frequency and modulation mode" (22) shown in FIGS. 5 and 6.

The value of the k of the high frequency k·fc employed for suppressing the side band noise in the regions A and B is preferable to be such that $1 < k < 2$. If $k \leq 1$, no effect is obtained for suppressing the side band noise, and if $k > 2$, the switching loss is large. The present embodiment employs the value of $k=1.5$ to obtain the high frequency of 7.5 kHz.

If the high frequency is obtained by setting $k=1.5$, in the regions A and B in which the high frequency k·fc is employed for suppressing the side band noise, the sum of the power losses of the electric motor 10*m* and the inverter 19*m* (similarly, 10*g* and 19*g*), that is, the overall loss, approximately equals that of the reference example that does not employ the high frequency but entirely employs the low frequency fc (5 kHz), as shown in FIG. 10. That is, in the region "A", although the iron loss (core loss) of the electric motor 10*m* is increased in the range of comparatively low rotational speed by making the frequency to be the high frequency k·fc, the switching loss of the inverter 19*m* is reduced by the change from the three-phase modulation to the two-phase modulation. Therefore, the overall loss is not particularly increased. In the region "B", the carrier frequency is switched to the high frequency while the two-phase modulation is maintained. Therefore, although the switching loss of the inverter 19*m* is increased, the overall loss is not particularly increased because the iron loss is reduced.

As described above, no particular increase in the overall loss is generated according to the present embodiment of the present invention. Because the high frequency k·fc is employed in both of the regions A and B, the side band noise is suppressed. That is, the present embodiment can suppress the side band noise without particularly increasing the power loss of the electric motor drive.

The control function of the motor control device 30*m* for controlling operation of the electric motor 10*m* rotationally driving the wheels has been described above.

Refer again to FIG. 1. The electric motor 10*g* rotationally driven by an engine on the vehicle may be called a generator or a motor generator. In the present embodiment, the electric motor 10 g serves as an electric motor (power running) for driving the engine to start when starting the engine, and as a generator (regeneration) for generating electric power by being rotationally driven by the engine after started. The function and operation of the motor control device 30*g* for controlling the electric motor 10 g are the same as those of the motor control device 30*m*. In addition, the structure and function of the inverter 19*g* for supplying power to the electric motor 10*g* are the same as those of the inverter 19*m*. The structure and function of the motor control device 30*g* are the same as those of the motor control device 30*m*.

When starting the engine, a target torque TM*g of a positive value is provided from the unshown main controller to the motor control device 30*g*, and the motor control device 30*g* performs a control operation similar to the control operation of the motor control device 30*m* described above. After the engine has started and the output torque thereof has increased, the main controller switches the target torque TM*g to a negative value for generation (regeneration). Consequently, the motor control device 30*g* controls the inverter 19*g* so that the output torque of the electric motor 10*g* coincides with the target torque (target load of the engine) of the negative value. The contents of this calculation (output control calculation) are also similar to the output control calculation of the motor control device 30*m* described above.

As described above, the secondary-side voltage Vuc (the voltage of the secondary-side capacitor 23) serving as an output voltage of the converter 60 is used for calculation of the torque command limitation in the motor control devices 30*m* and 30*g*, and also used for calculation of the field weakening currents $\Delta id$ and $\Delta iq$. Within the maximum value of the secondary-side voltage which can be achieved with the power capacity of the primary-side direct current power source (battery 18, primary-side capacitor 22), it is preferable to adjust the secondary-side voltage Vuc so as to correspond to the target torques TM*m, TM*g and the rotational speeds, that is, so as to be the higher, the larger the target torques are, and so as to be the higher, the higher the rotational speeds are. The converter control device 30*v* adjusts the secondary-side voltage Vuc.

In the present embodiment, the converter control device 30*v* is also an electronic control device mainly formed of a microcomputer, and includes the microcomputer, an unshown interface (signal processing circuit), and a PWM pulse generator. The converter control device 30*v* further includes an unshown interface (communication circuit) between the microcomputer and the main controller of the unshown vehicle drive control system on the vehicle.

The converter control device 30v reads a secondary-side target voltage Vuc*m (first secondary-side target voltage Vuc*m) provided by the motor control device 30m and a secondary-side target voltage Vuc g (second secondary-side target voltage Vuc*g) provided by the motor control device 30g, and converts to digital and reads the battery voltage Vdc and the secondary-side voltage Vuc detected by the sensors 21 and 24, respectively. Next, the higher voltage of the first secondary-side target voltage Vuc m or the second secondary-side target voltage Vuc g is determined to be a target voltage Vuc*, and a PWM signal Pvf for on/off control of the semiconductor switch 62 for voltage step-up and a PWM signal Pvr for on/off control of the semiconductor switch 63 for regeneration (for voltage step-down) are generated and provided to a drive circuit 20v so that the voltage Vuc detected by the voltage sensor 24 coincides with the target voltage Vuc*. The drive circuit 20v turns on and off the semiconductor switches 62 and 63 based on the PWM signals Pvf and Pvr. The on and off of the semiconductor switch 62 for voltage step-up of the converter 60 is PWM-controlled when the voltage needs to be stepped up, whereas the on and off of the semiconductor switch 63 for regeneration of the converter 60 is PWM-controlled when the voltage needs to be stepped down. The semiconductor switch 62 for voltage step-up and the semiconductor switch 63 for regeneration are switched in a complementary manner so that the latter is held off while the former is on, and the latter is held on while the former is off.

According to an exemplary aspect of the invention, the side band noise can be suppressed by the switching to the high frequency, and also the switching loss can be suppressed because of the switching to the two-phase modulation mode at the same time as the switching to the high frequency.

According to an exemplary aspect of the invention, because the switching loss is already small due to the continuation of the two-phase modulation mode, the switching loss does not become large even after the switching to the high frequency for suppressing the side band noise.

According to an exemplary aspect of the invention, coil currents of the electric motor can suppress a core loss (iron loss) and the inverter switching loss caused by harmonic distortion to low values.

According to an exemplary aspect of the invention, hunting can be avoided when the switching occurs frequently from outside of the predetermined region to inside thereof, or vice versa.

According to an exemplary aspect of the invention, the torque step generated by the switching from the three-phase modulation to the two-phase modulation can be reduced in which the torque step occurs corresponding to the hysteresis in the switching of the carrier frequency that is generated by making a judgment based on the first region as to whether the low/high switching of the carrier frequency is necessary and also by making a judgment based on the second region located outside of the first region as to whether the high/low switching of the carrier frequency is necessary. The torque step generated by the switching from the two-phase modulation to the three-phase modulation can also be reduced.

According to an exemplary aspect of the invention, the operation and advantageous effects described above can be obtained, for example, in the drive unit mounted on an EV.

What is claimed is:

1. An electric motor control device comprising:
    a direct current power source;
    an inverter interposed between an electric motor and the direct current power source, the inverter device controlling an exchange of electric power therebetween;
    an inverter control unit that generates PWM pulses having a duty ratio corresponding to voltage command signals and sends the PWM pulses to the inverter in order to switch the inverter;
    a frequency changing unit that changes a carrier frequency of the PWM pulses generated by the inverter control unit in a manner corresponding to a frequency control signal; and
    a motor control unit that provides, when a target torque and a rotational speed of the electric motor are in a predetermined region, the frequency changing unit with the frequency control signal that sets the carrier frequency to a high frequency, and during this switching, if a voltage control mode that controls three phase voltages of the electric motor is a three-phase modulation mode in which each of the three phase voltages is controlled through PWM, switches the mode to a two-phase modulation mode in which two phases are controlled through PWM while PWM switching is not applied to the other one phase, that provides, when the target torque and the rotational speed are outside of the predetermined region, the frequency changing unit with the frequency control signal for setting the carrier frequency to a low frequency that is lower than the high frequency, and that provides the inverter control unit with the voltage command signals that makes an output torque of the electric motor coincide with the target torque.

2. The electric motor control device according to claim 1, wherein, if the voltage control mode is the two-phase modulation mode, the motor control unit continues the two-phase modulation mode even after switching to the high frequency, when switching the carrier frequency from the low frequency to the high frequency.

3. The electric motor control device according to claim 1, wherein, denoting the low frequency as fc, the high frequency is k·fc, where $1 \leq k < 2$.

4. The electric motor control device according to claim 1, wherein the motor control unit:
    determines the voltage control mode based on a modulation ratio that is a ratio of an electric motor target voltage to a direct current voltage provided by the direct current power source to the inverter and on the rotational speed of the electric motor, and
    expands a region for the modulation ratio and the rotational speed in which the two-phase modulation mode is performed, by changing the modulation mode from the three-phase modulation mode to the two-phase modulation mode when the carrier frequency is the high frequency in the three-phase modulation mode or when the carrier frequency is the high frequency and the voltage control mode is determined to be the three-phase modulation mode.

5. The electric motor control device according to claim 1, wherein:
    the predetermined region includes a first region and a second region that includes the first region and that is wider than the first region, and
    the motor control unit switches the carrier frequency at the low frequency to the high frequency when the target torque and the rotational speed of the electric motor are made to be in the first region, and switches the carrier frequency at the high frequency to the low frequency when the target torque and the rotational speed of the electric motor are made to be outside of the second region.

6. The electric motor control device according to claim 5, wherein:

during a first transition in which the carrier frequency is switched from the low frequency to the high frequency and also the voltage control mode is switched from the three-phase modulation to the two-phase modulation, the motor control unit corrects the target torque by adding to the target torque a first torque correction value to reduce a torque step between before and after the switching, during a second transition that is switching in an opposite manner to the first transition, the motor control unit corrects the target torque by adding to the target torque a second torque correction value to reduce a torque step between before and after the switching, and the motor control unit provides the inverter control unit with the voltage command signals for making the output torque of the electric motor coincide with the corrected target torque.

7. The electric motor control device according to claim 1, wherein the predetermined region is a region for suppressing side band noise, and the high frequency is a frequency for reducing the side band noise.

8. The electric motor control device according to claim 1, wherein the low frequency is a frequency for reducing a switching loss of the inverter.

9. A drive unit comprising:
the electric motor control device as claimed in claim 1; and
the electric motor that is supplied with power by the inverter included in the electric motor control device and that drives wheels.

10. A hybrid drive unit comprising:
a direct current power source;
a first electric motor that drives wheels;
a second electric motor rotationally driven by a fuel engine;
a first inverter interposed between the first electric motor and the direct current power source, the first inverter controlling an exchange of electric power therebetween;
a second inverter interposed between the second electric motor and the direct current power source, the second inverter controlling an exchange of electric power therebetween;
a first inverter control unit that generates first PWM pulses having a duty ratio corresponding to first voltage command signals and sends the first PWM pulses to the first inverter in order to switch the first inverter;
a second inverter control unit that generates second PWM pulses having a duty ratio corresponding to second voltage command signals and that sends the second PWM pulses to the second inverter in order to switch the second inverter;
a first frequency changing unit that changes a first carrier frequency of the first PWM pulses generated by the first inverter control unit in a manner corresponding to a first frequency control signal;
a second frequency changing unit that changes a second carrier frequency of the second PWM pulses generated by the second inverter control unit in a manner corresponding to a second frequency control signal;
a first motor control unit that provides, when a target torque and a rotational speed of the first electric motor are in a first predetermined region, the first frequency changing unit with the first frequency control signal that sets the first carrier frequency to a high frequency, and during this switching, if a voltage control mode for controlling three phase voltages of the first electric motor is a three-phase modulation mode in which each of the three phase voltages is controlled through PWM, switches the mode to a two-phase modulation mode in which two phases are controlled through PWM while PWM switching is not applied to the other one phase, that provides, when the target torque and the rotational speed are outside of the first predetermined region in a case that the first carrier frequency is the high frequency, the first frequency changing unit with the first frequency control signal that sets the first carrier frequency to a low frequency that is lower than the high frequency, and switches the modulation mode to the three-phase modulation mode if a condition for switching to the three-phase modulation mode is satisfied, and that provides the first inverter control unit with the first voltage command signals that makes an output torque of the first electric motor coincide with the target torque; and
a second motor control unit that provides, when a target torque and a rotational speed of the second electric motor are in a second predetermined region, the second frequency changing unit with the second frequency control signal that sets the second carrier frequency to a high frequency, and during this switching, if a voltage control mode for controlling three phase voltages of the second electric motor is a three-phase modulation mode in which each of the three phase voltages is controlled through PWM, switches the mode to a two-phase modulation mode in which two phases are controlled through PWM while PWM switching is not applied to the other one phase, that provides, when the target torque and the rotational speed are outside of the second predetermined region in the case that the second carrier frequency is the high frequency, the second frequency changing unit with the second frequency control signal that sets the second carrier frequency to a low frequency that is lower than the high frequency, and then switches the modulation mode to the three-phase modulation mode if a condition for switching to the three-phase modulation mode is satisfied, and that provides the second inverter control unit with the second voltage command signals that makes an output torque of the second electric motor coincide with the target torque.

* * * * *